United States Patent [19]
Burns et al.

[11] Patent Number: 5,161,759
[45] Date of Patent: Nov. 10, 1992

[54] WIRE BUNDLE RETAINER

[75] Inventors: Timothy J. Burns, St. Clair; Lawrence J. Higgins, Sterling Heights; Nicholas Jackson, Marine City; Nicholas M. Benedetti, Sterling Heights, all of Mich.

[73] Assignee: Emhart, Inc., Del.

[21] Appl. No.: 716,301

[22] Filed: Jun. 17, 1991

[51] Int. Cl.⁵ ............................................. B65D 67/02
[52] U.S. Cl. .................................... 248/71; 248/74.2; 248/74.4
[58] Field of Search ................. 248/73, 74.1–74.4, 248/71

[56] References Cited

U.S. PATENT DOCUMENTS

| 2,972,494 | 2/1961 | Dominic | 403/460 |
| 4,564,163 | 1/1986 | Barnett | 248/71 |

FOREIGN PATENT DOCUMENTS

| 948649 | 8/1949 | France | 248/74.4 |
| 625876 | 12/1962 | France | 248/74.4 |
| 2069653 | 8/1981 | United Kingdom | 248/74.2 |

Primary Examiner—Alvin C. Chin-Shue
Attorney, Agent, or Firm—Spencer T. Smith

[57] ABSTRACT

A retainer which will secure a wire bundle to a panel like the retainer is hinged U shaped portions which can be releasably closed to clamp the bundle between deflectable pair of spreadable wings.

2 Claims, 1 Drawing Sheet

WIRE BUNDLE RETAINER

Wire bundles are routed within a car body to interconnect the electrical components with their controller.

It is important for any fastener used in a car to be light weight to minimize car weight, easy to install to keep labor charges to a minimum and rattleproof to avoid passenger annoyance.

It is accordingly an object of the present invention to provide a wire bundle retainer which is light weight, simple to install and rattleproof.

Other objects and advantages of the present present invention will become apparent from the following portion of this specification and from the accompanying drawings which illustrates in accordance with the mandate of the patent statutes a presently preferred embodiment incorporating the principles of the invention.

Referring to the drawings.

Figure 1:
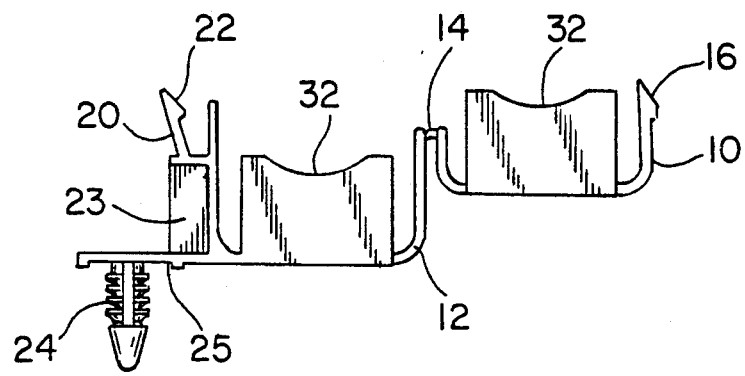
FIG. 1 is a side view of the wire bundle retainer made in accordance with the teachings of the present invention.
Figure 2:
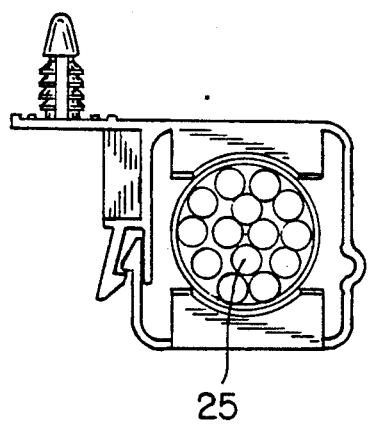
FIG. 2 is an end view of the wire bundle retainer secured in position without retaining a wire bundle.
Figure 3:
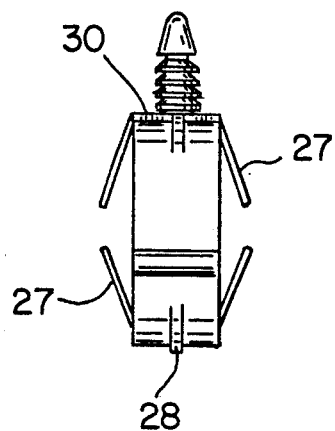
FIG. 3 is a side view of the wire bundle retainer secured in position and retaining a wire bundle.

The wire bundle retainer which is molded from plastic has upper 10 and lower 12 "U" shaped portions which are hinged 14 together at one side and latched together on the other. The triangular catch 16 defined at the free end of the upper U shaped portion is received by a latch defined between the free end 18 of the lower U shaped portion and a deflectable element 20 having a triangular latch 22. The force required to deflect this deflectable element is increased by locating a non deflectable strut 23 below the deflectable member.

To use the retainer the fastener 24 which is generally referred to a Christmas tree fastener which can be located on an extension 25 as shown or on any wall of the retainer (and which can be any other type of fastener) is pushed into a suitable hole in the body of a car and the cable 25 is located between the opposed pairs of spaced wings 27 which project from the top 28 and bottom 30 walls of the upper and lower portions. As the upper and lower portions are closed on the wire bundle 26 these wings 27 which are initially slightly bowed outwardly spread further outwardly clamping the wire bundle therebetween. The ends of the wings are notched 32 to center the wire bundle and the inner edge of these notched surfaces has a radius to prevent the cutting of the wire bundle and the wings may be tapered so that they are thinner at the notched edge. When the wire bundle is fully clamped, the latch and catch cooperate to maintain the wire bundle retained within the retainer.

We claim:

1. A molded plastic wire bundle retainer comprising upper and lower "U" shaped portions, means for hingedly interconnecting one end of said upper and lower U shaped portions, means for releasably interconnecting the other end of said upper and lower U shaped portions, fastener means for securing said wire bundle retainer to a panel having means for receiving said fastener means, said upper U shaped portion including a top wall having a pair of wings extending downwardly and outwardly from either side thereof and pivotally bendable relative thereto, the downwardmost edge of each of said wings being notched, said lower U shaped portion including a bottom wall having a pair of wings extending upwardly and outwardly from either side thereof and pivotally bendable relative thereto, the uppermost edge of each of said wings being notched, whereby when a wire bundle is located between said upper and lower wing pairs as the upper U shaped portion is pivoted relative to said lower U shaped portion to releasably interconnect said portions, said wings will be forced to pivot further outwardly with the wing notches centering the wire bundle in said retainer as the wire bundle is clamped therebetween.

2. A wire bundle retainer according to claim 1, wherein said wings are thinner at the bundle engaging edge than at said wall.

* * * * *